United States Patent [19]
Garvey et al.

[11] Patent Number: 5,924,838
[45] Date of Patent: Jul. 20, 1999

[54] TRAY LOADER

[75] Inventors: William J. Garvey, Sweetwater; Francis J. Garvey, Newfield; David W. Bintliff, Tuckerton; David J. Roback, Williamstown, all of N.J.

[73] Assignee: Garvey Corporation, Blue Anchor, N.J.

[21] Appl. No.: 08/038,963

[22] Filed: Mar. 29, 1993

[51] Int. Cl.⁶ .................................................. B65G 57/20
[52] U.S. Cl. ........................ 414/791.7; 198/434; 53/543; 414/799
[58] Field of Search ............................. 414/791.6, 791.7, 414/799; 198/432, 434; 53/543, 495

[56] References Cited

U.S. PATENT DOCUMENTS

| | | | |
|---|---|---|---|
| 3,165,871 | 1/1965 | Roth et al. | 53/543 |
| 3,172,547 | 3/1965 | Holstebroe | 414/791.7 |
| 3,570,685 | 3/1971 | Carlson | 414/791.7 |
| 3,612,299 | 10/1971 | Shaw | 414/791.7 |
| 4,132,305 | 1/1979 | Mastak | 198/432 |
| 4,162,722 | 7/1979 | Early | 198/434 |
| 4,934,508 | 6/1990 | Vander Meer et al. | 198/434 |
| 5,267,590 | 12/1993 | Pringle | 414/791.7 |

Primary Examiner—Janice L. Krizek
Assistant Examiner—Gregory A. Morse
Attorney, Agent, or Firm—Norman E. Lehrer

[57] ABSTRACT

A tray loading apparatus for the efficient loading of cylindrical articles onto trays. The apparatus functions to align cylindrical articles in a staggered manner so as to make the most efficient use of space. As such, a subsequent manufacturing process such as freeze drying is allowed to reach the largest amount of articles per operation, thereby saving time, energy and cost. The apparatus uses a conveyor having a staggering mechanism which includes undulated guides located adjacent the edges of the conveyor. The undulated guides have an edge facing the conveyor surface formed from a plurality of triangular peaks and valleys. At least one of the guides is connected to an oscillating mechanism for assisting the staggering of the articles. A slide plate which moves transversely to the conveyor includes a tray loading section. The tray loading section is adapted to be moved into alignment with the conveyor so as to accumulate the articles therein in the staggered pattern. After filling the tray loading section with the articles, the slide plate is moved with the articles loaded therein to a tray loading position. Trays which are positioned for receiving the articles within the slide plate assembly, are then loaded with the articles having been efficiently arranged. The trays are then removed and the slide plate assembly is returned into alignment with the conveying section.

9 Claims, 5 Drawing Sheets

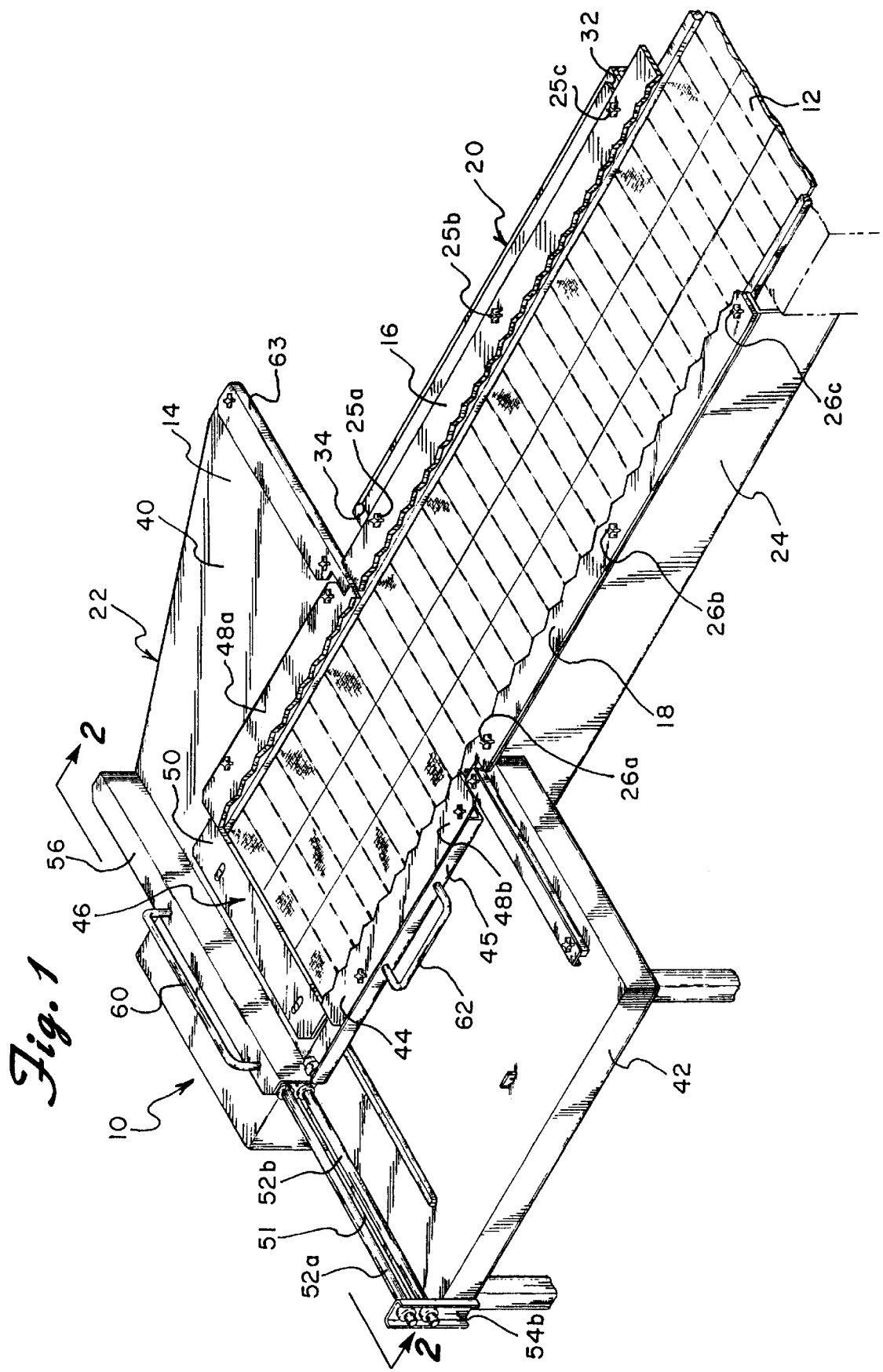

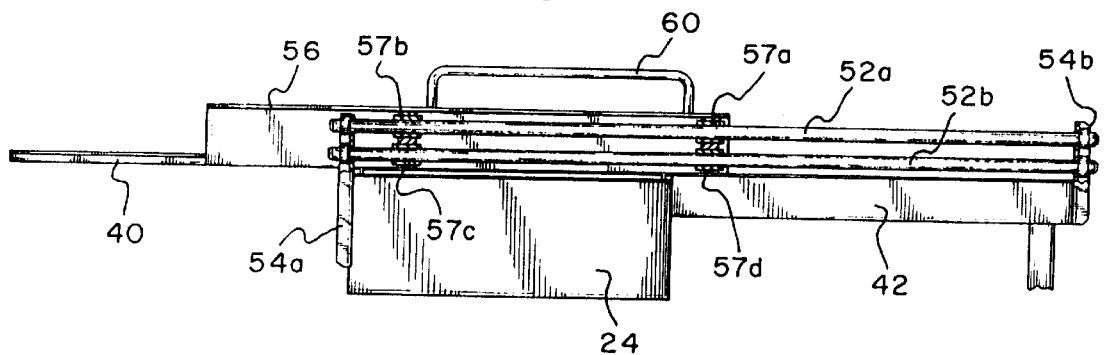
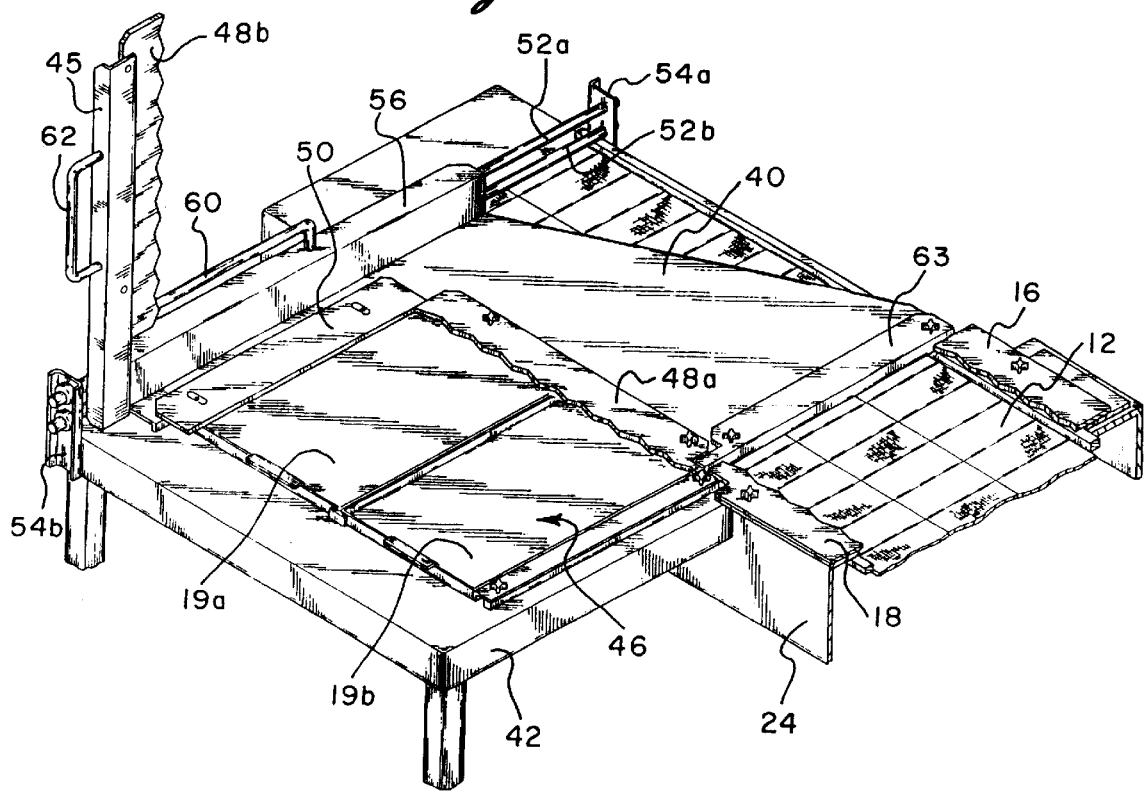

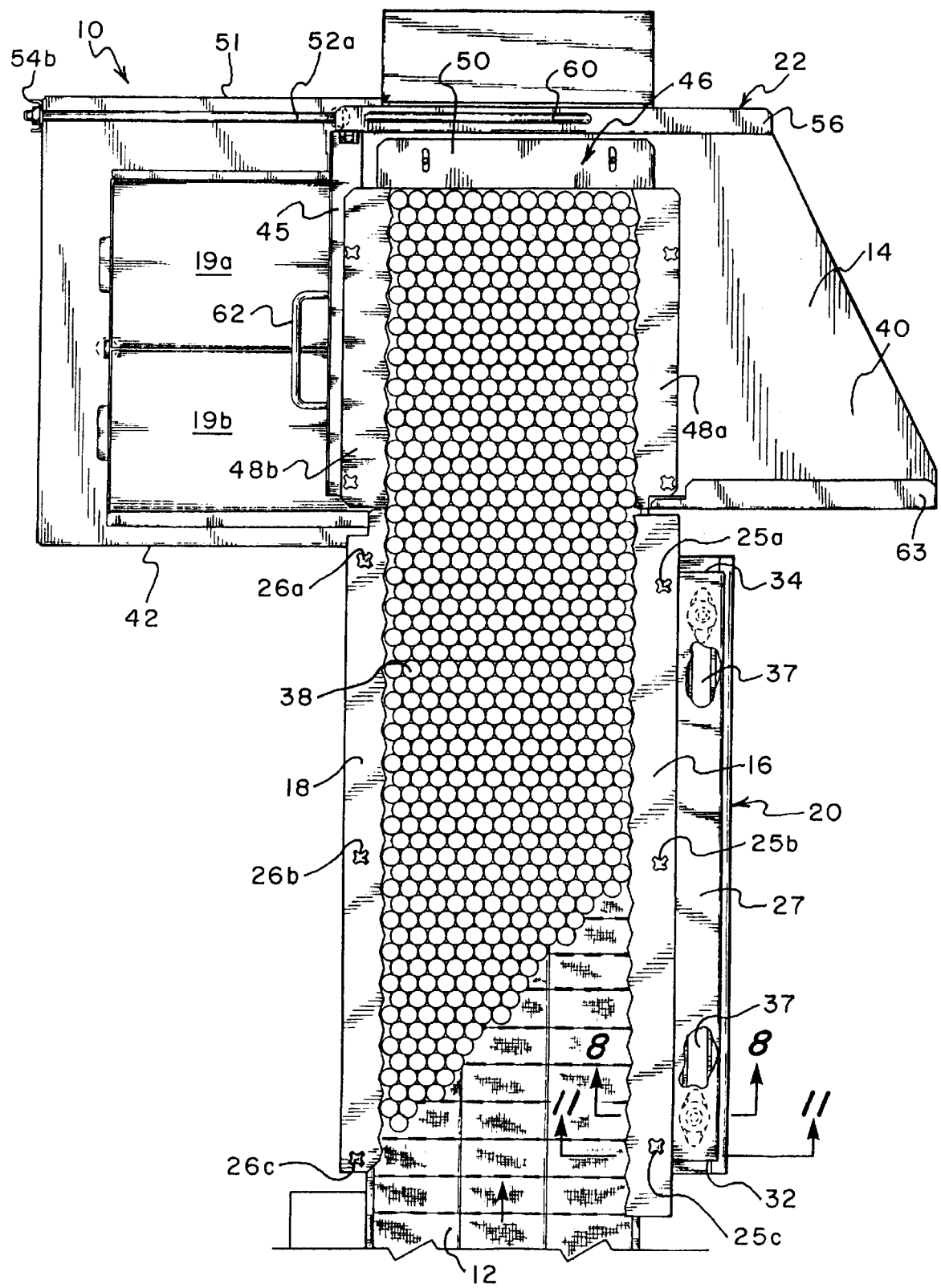

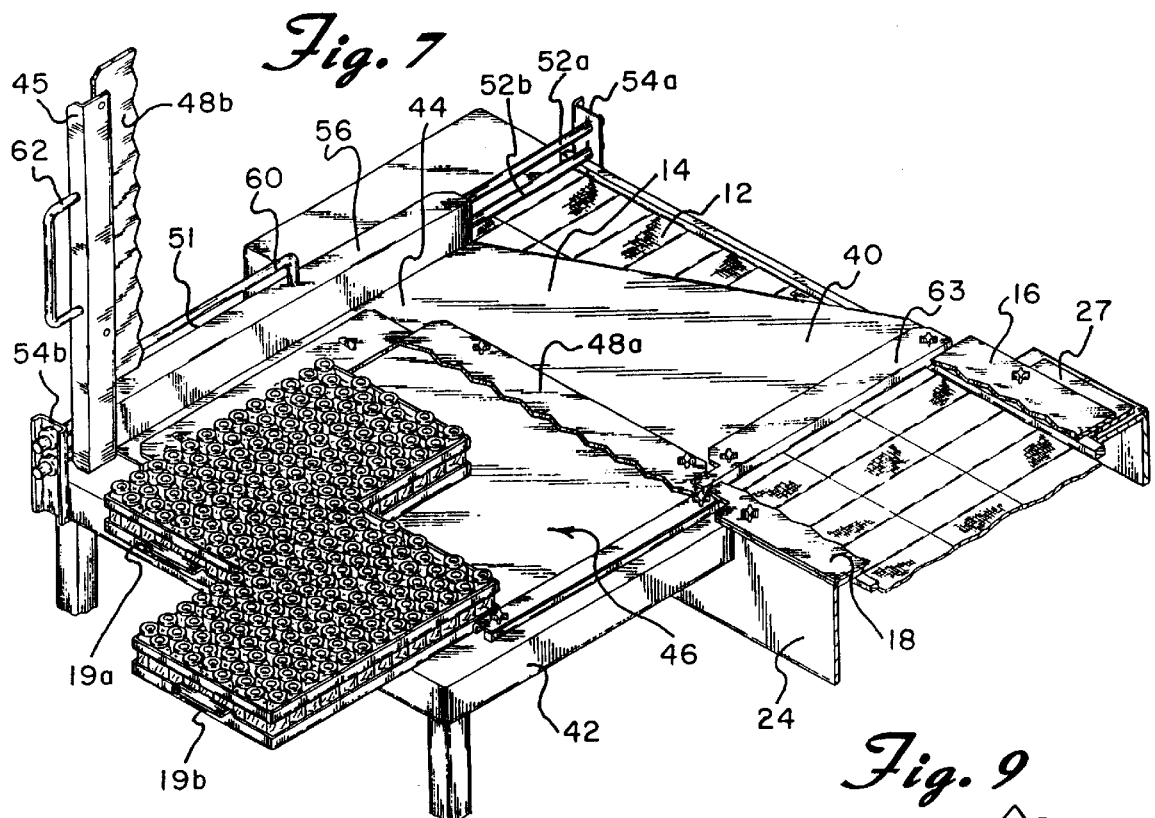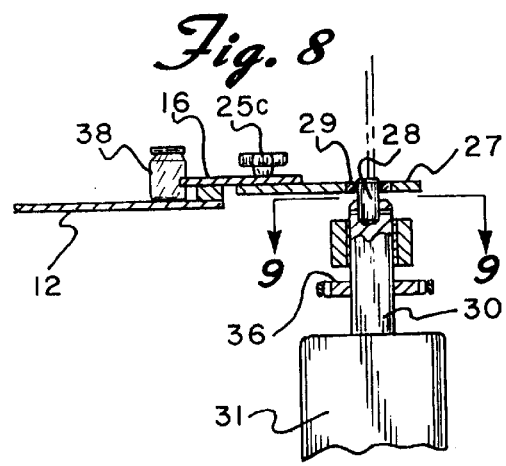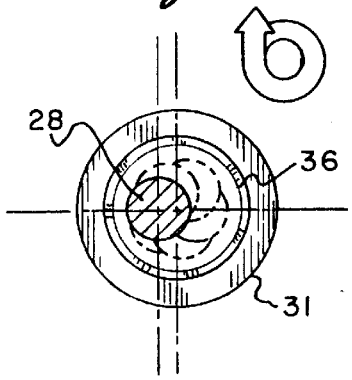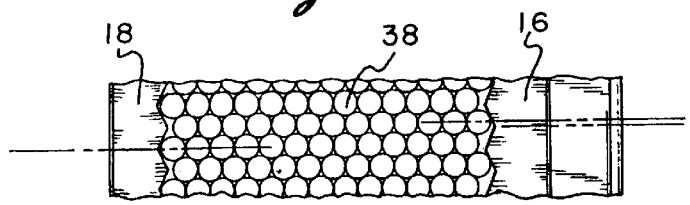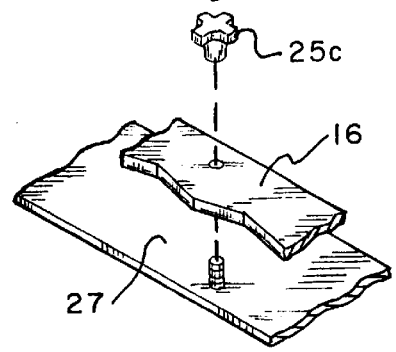

5,924,838

TRAY LOADER

BACKGROUND OF THE INVENTION

This invention relates to article conveyors and more particularly to an article conveyor used for staggering articles for the purpose of efficient loading the same onto trays. By staggering the articles, a larger amount of articles can be accommodated by each tray.

Article conveying systems are used for transporting articles of various types from a first position to a second position wherein at the second position, it is likely that another operation is performed with respect to the articles. Articles are generally transported in single file such that when they reach the second position for an operation such as removal or unloading, the articles are arranged in side by side columns and rows. However, this row/column arrangement of articles is generally inefficient with regard to loading the articles for another operation or with regard to packaging the articles. By observing a row/column arrangement of cylindrical articles, it is obvious that a large amount of space is wasted between the articles.

One of the operations that may be desired is the loading of the articles onto individual trays, pallets or the like, for storage in a remote location or for a further manufacturing process with respect to the articles. Loading may be accomplished in a number of ways including pushing, dropping, or sliding, as in the instant invention, the articles to their destination. It is desirable to use space efficiently so that the maximum number of articles can be carried on a tray. Accordingly, during a subsequent manufacturing process such as freeze drying the contents of the articles on the trays, the largest number of articles possible per operation can be freeze dried, etc., thereby saving in expended time, energy and subsequential cost. Therefore, with cylindrically shaped articles, it is desirable to have the articles placed on the trays in a staggered relationship. The prior art does disclose palletizing apparatuses which accumulate articles and arrange them in a staggered relationship but none is for the same purpose of the present invention nor does any employ the structural arrangement hereof.

U.S. Pat. No. 3,659,726 to Anderson, for example, discloses a palletizing apparatus. The palletizer accumulates layers of cans in patterns of staggered rows. The cans are initially gathered in a single file and are then moved by row into a staggered pattern. The newly arranged cans are then transferred to an adjacent plate and dropped onto a pallet. The method of staggering is different and more complicated than the present invention and is not necessarily applicable to the loading of trays for placement into freeze driers, nor is the transfer to the pallet accomplished via a sliding mechanism.

U.S. Pat. No. 4,936,077 to Langen et al. discloses a carton loading machine. The invention in Langen accumulates cylindrically shaped objects in a row/column relationship. A mechanism is used to displace a row of cylindrically shaped objects adjacent to a non displaced row such that a staggered relationship between the objects is formed. As such, the articles are pushed into a package and upon pushing, they are rearranged into a row/column pattern for filling the space of the carton. Again, the patent to Langen et al. discloses a much more complicated means for staggering the cylindrically shaped articles and, in turn, disrupts the staggered relationship for packaging purposes which is dissimilar to the efficiency purpose of the present invention. Also, Langen uses a pushing and not a sliding mechanism for loading the cartons.

Similarly, U.S. Pat. No. 4,642,967 to Culpepper discloses a packaging machine used for loading articles onto trays or carton blanks via a pusher mechanism and the articles are loaded onto the trays in a row/column arrangement and not a staggered arrangement as in the current invention.

Other patents disclose apparatuses which have mechanisms for aligning articles in a staggered relation to each other. In U.S. Pat. No. 4,132,305 to Mastak, the staggered patterns are formed by the use of a somewhat complicated arrangement of conveyors moving in different directions. A main conveyor sends the articles in a primary direction while subsequent conveyors, moving in directions transverse to the primary direction, shift the articles for acquiring the staggered pattern. The apparatus uses a uniformly jagged end plate for maintaining the articles in the staggered position. However, the jagged end plate does not function to cause the staggered arrangement of the articles as do the scalloped and oscillating plates used in the present invention.

U.S. Pat. No. 4,214,419 to Allen et al. similarly discloses the use of a scalloped end plate for assisting in staggering articles to be packaged via a shrink wrap machine. However, as shown in FIG. 1 of that patent, the scalloped end plate is used only for maintaining the articles in a staggered orientation and not for forming the same. The invention in Allen et al. uses a conveyor with an automatically adjusting alignment wall for moving the incoming articles into a proper orientation for forming a staggered pattern. The Allen et al. mechanism is more complex than the instant invention and seemingly could not handle the volume of the instant invention based upon the limited single file capacity of the alignment wall.

SUMMARY OF THE INVENTION

The present invention is directed toward a tray loading machine used for efficiently loading cylindrical articles such as bottles or vials onto storage trays. The trays are efficiently loaded for subsequent manufacturing processes, most particularly freeze drying of the contents in the articles thereon. By efficiently loading the trays, the number of articles capable of being freeze dried, etc., in a single operation of the freeze drying apparatus, is increased thereby decreasing the use of time, energy and the cost flowing therefrom.

The tray loading apparatus incorporates the use of undulated guides which cause the articles being conveyed to be arranged in a staggered pattern. In addition, one of the undulated guides is subject to oscillating motion for assisting the movement of the articles into the desired pattern. Finally, the properly orientated articles are removed by a sliding structure used for transferring the articles onto the trays.

The invention includes an accumulating conveyor for transferring the articles from an input source to the sliding structure. The horizontally extending elongated conveyors have an input area free from any undulated guides. This area leads into another section of the conveyor wherein first and second undulated guides are located on the left and right sides of the conveyor. The guides cause the articles to become arranged in a staggered orientation based upon the peaks and valleys of the guides. One of the side undulated guides, extending parallel to the direction of flow, is subject to oscillating motion so as to assist the articles in properly aligning in the desired staggered formation. The guides are easily removable for replacement with different size guides for accommodating different size cylindrical articles.

A slidable tray loading plate is located at the end of the conveyor. The plate is comprised of a substantially rectangular frame attached to guide rods, having an opening therein for alignment with the conveyor. The opening is substantially C-shaped having undulated guides forming the sides of the C-shaped opening and the end being a straight edged guide. The opening is adapted to be moved into alignment with the conveyor for movement of the staggered articles into the opening. Upon filling the opening, the slide plate, with the articles, is adapted to be moved backward and into alignment with awaiting trays.

The trays are equivalent in size to the C-shaped opening for fully accommodating the articles located within the slide plate opening. The trays can then be removed from the apparatus and placed in storage. Upon movement of the slide plate to the tray loading position, an extension extending transversely to the conveying direction is moved across the conveyor for stopping the conveyance of the articles and causing the same to reestablish a staggered orientation.

The apparatus is used by supplying the conveyor with cylindrical articles to be loaded into the storage trays. Initially, the slide plate is moved out of alignment with the conveyor such that the stop extending from the slide plate traverses the conveyor. The articles accumulate on the conveyor in a staggered orientation due to the undulated guides and the oscillating motion. Upon accumulation of a sufficient number of articles for loading the trays, an electronic signal is given and the slide plate is ready for movement into alignment with the conveyor. During movement, a stop switch is activated such that the conveyor is temporarily shut off. Upon complete alignment, the conveyor switches on again and the opening is filled. The slide plate is then moved to the tray loading position where the trays are loaded with the articles for removal and transferred to a next process such as freeze drying and the conveyor resumes conveying.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a top perspective view of the tray loading apparatus of the invention;

FIG. 2 is a side view of the tray loading apparatus taken along line 2—2 of FIG. 1;

FIG. 3 is a perspective view of the slide plate portion of the tray loading apparatus in the tray loading position;

FIG. 4 is an overhead view of the tray loading apparatus in the slide plate loading position;

FIG. 7 is a perspective view of the tray loading apparatus showing the removal of the trays from the apparatus;

FIG. 8 is an elevational view, partly in section, of the oscillating mechanism of the tray loading apparatus taken along line 8—8 of FIG. 4;

FIG. 9 is a top view of the oscillating shaft taken along the line 9—9 of FIG. 8 showing the oscillating motion of the same;

FIG. 10 is an overhead view of the articles in the staggered orientation showing the alignment of each article's centerline with the undulated guides, and FIG. 11 is an exploded view taken along line 11—11 of FIG. 4 showing the method of attachment of the guides to the tray loading apparatus.

DETAILED DESCRIPTION OF THE PREFERRED EMBODIMENT

Figure 5:
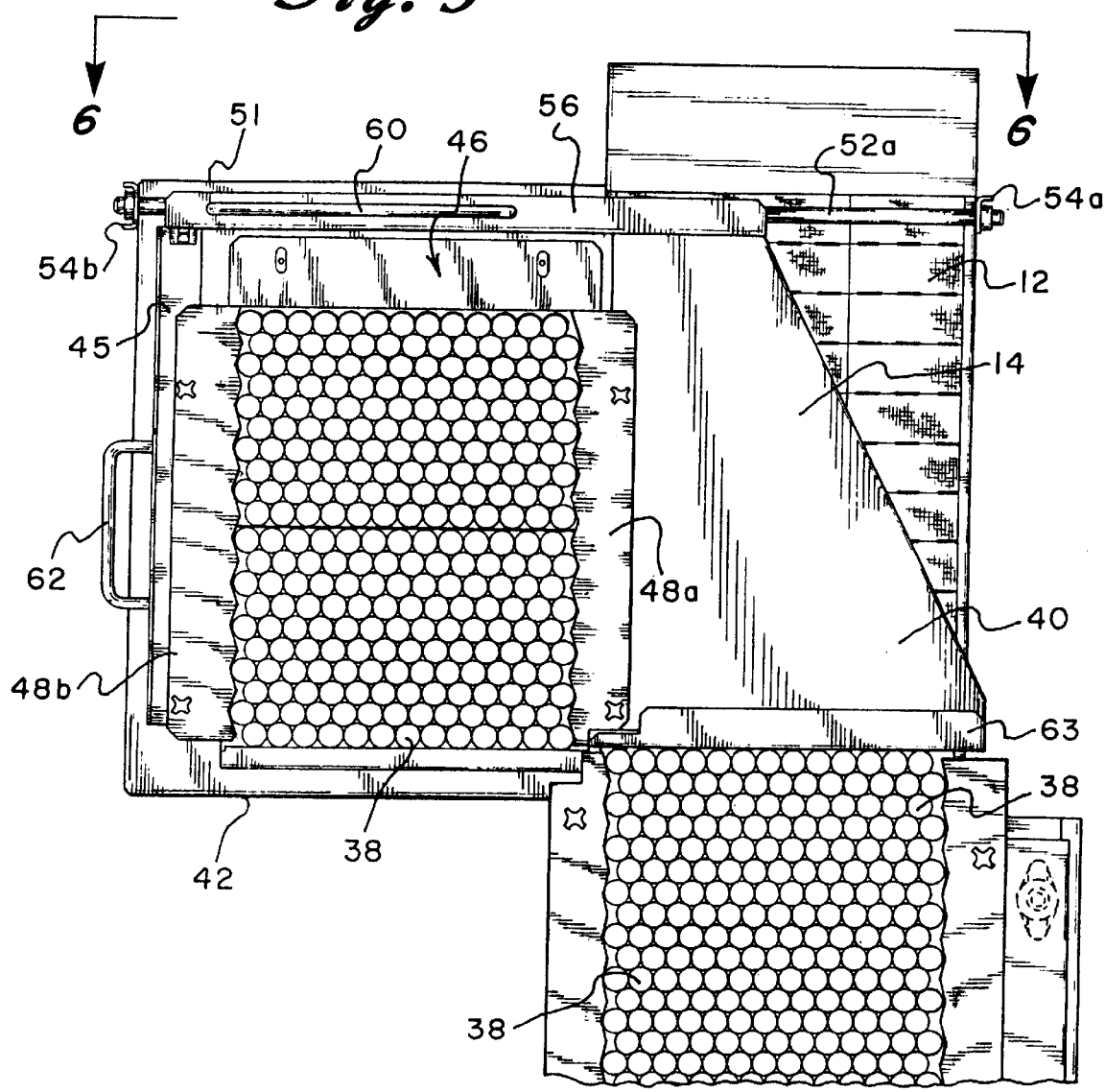
FIG. 5 is an overhead view of the tray loading apparatus in the tray loading position.
Figure 6:
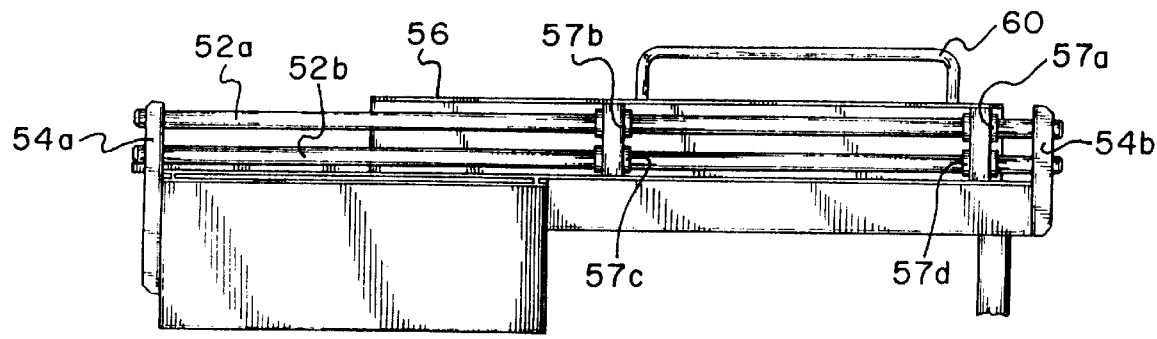
FIG. 6 is an end view of the tray loading apparatus in the tray loading position taken along line 6—6 of FIG. 5.

Referring now to the drawings in detail, wherein like reference numerals have been used throughout the various figures to designate like elements, there is shown in FIG. 1 a perspective view of the tray loading apparatus constructed in accordance with the principles of the present invention and designated generally as 10. The tray loading apparatus 10 is comprised primarily of the conveyor 12, the slide plate assembly 14, the oscillating undulated guide 16 and the stationary guide 18.

The conveyor 12 is comprised of a known conveyor belt system flowing in the direction toward the slide plate assembly 14. The width of the conveyor is based on the holding capacity of the trays 19a and 19b (FIG. 7) of the slide plate assembly 14. The tray loading apparatus can be broken down into two separate parts, the staggering portion 20 and the movable portion 22 which consists primarily of the slide plate assembly 14.

The staggering portion 20 is comprised of the oscillating undulated guide 16 and the stationary guide 18. Both guides 16 and 18 are constructed from a planar piece of elongated metal, plastic or other material. Each guide has a substantially straight side and two substantially straight ends with an undulated side facing inwardly towards the conveying surface. The undulated side is formed from uniform V-shaped peaks and valleys wherein guide 18 is connected to the frame 24 and oscillating guide 16 is connected to the motion plate 27 via integral threaded bolts and hand knobs 25a, 25b and 25c and 26a, 26b and 26c, respectively. The peaks of guide 16 are in alignment with the valleys of guide 18 and visa versa as shown in FIG. 10 so as to cause the staggered arrangement and assure that each row has an equivalent number of articles. The guides 16 and 18 are easily removable to allow the user of the machine to change the size of the guide by replacing it with a guides having a different size peak and valley structure for accommodating different size articles being transferred and accumulated by the machine.

The oscillating undulating guide 16 is set into oscillating motion via its attachment to an eccentric shaft. Referring to FIG. 8, the guide 16 is, as discussed above, attached to a motion plate 27 at three positions as shown in FIG. 1 by the knobs 25a, 25b and 25c. The motion plate 27 is an elongated flat plate which is connected to an eccentric shaft 28 through an appropriate size bearing 29. The eccentric shaft 28 is integrally connected to the drive shaft 30 of motor 31. As shown in FIG. 8, the eccentric shaft 28 is pinned into the drive shaft 30 off the center of the drive shaft. As represented in FIG. 9, this offset causes the eccentric shaft to move in a circular motion. In turn, the oscillating guide 16 is also moved in a circulatory motion.

As shown in FIG. 4, the oscillating guide 16 is set into oscillating motion at two locations. FIG. 8 is representative of the oscillating mechanism at end 32 as shown in FIG. 4. A sprocket or pulley 36 is attached to the drive shaft 30 and a chain or belt 37 is run to the second oscillating mechanism at the end 34. The second oscillating mechanism is substantially the same as the oscillating mechanism as shown in FIG. 8 but it does not have a driving mechanism 31 and is rotatable within a set of bearings. By use of the belt drive mechanism, the oscillating undulated guide 16 is subject to an equal amount of oscillation at ends 32 and 34 for providing a balanced movement of the oscillating guide.

As shown in FIG. 5, the articles 38 are conveyed to the end of the staggering section which end is represented by the stop plate 40 of the slide plate assembly 14. At this point, the articles 38 are in their staggered orientation and awaiting removal by the slide plate assembly 14 and subsequent loading onto trays 19a and 19b.

The slide plate assembly 14 is comprised of a second frame 42 extending perpendicular to the conveyor 12 and connected to the same and the slide plate 44 supported by the second frame 42. The second frame 42 is a substantially rectangular table structure in which the height of its surface, with the trays thereon, is on the same plane as the conveyor 12 to facilitate the transfer of the articles 38 to the trays 19a and 19b. The slide plate 44 is formed from a substantially L-shaped,frame and a,planar piece of sheet metal having a triangularly shaped stop plate 40 extending therefrom. The slide plate 44 is adapted to slide transversely of the flow direction of the conveyor section 12. The slide plate assembly 14 is further comprised of the release arm 45 attached to a leg, of the L of the slide plate 44 and orientated parallel to the flow direction.

The release arm 45 and the slide plate 44 form the tray loading section 46 which is substantially rectangular in shape and encompassed by the undulated perimeter guides 48a and 48b and the straight edge guide 50. The tray loading section 46 is adapted to be moved into direct alignment with the conveyor 12 of the staggering portion 20. The undulated perimeter guides 48a and 48b form the sides of the rectangular cut out and are adapted to be positioned directly in alignment with the oscillating guide 16 and stationary guide 18, respectively, when the tray loading section 46 is moved into position as shown in FIG. 1. The straight edge guide 50 forms the back or end portion of the tray loading section perimeter. The perimeter guides and the straight edge guide are attached to the L-shaped frame via hand knobs similar to those used for guides 16 and 18.

The tray loading section 46 can be moved into alignment with the conveyor 12 of staggering portion 20 via the slidable attachment of the slide plate 44 to the second frame 42. On the back edge 51 of the second frame 42, guide rods 52a and 52b extend the entire length of the second frame 42, including the width of the conveyor section 12. As such, the guide rods 52a and 52b cross over the conveyor 12 transversely to the direction of article flow. The guide rods are attached to the frame via brackets 54a and 54b such that the guide rods 52a and 52b are orientated in the same vertical plane, perpendicular to the surface of the conveyor 12 and the slide plate assembly 14. The slide plate 44 is attached to the guide rods 52a and 52b via the guide block 56, shown in FIGS. 1, 2, 3 and 7. The guide block 56 is substantially a rectangular tube being connected adjacent the back edge 58 of the slide plate 44.

Within the guide block 56, bearings 57a–57d, shown in FIG. 2, are appropriately mounted for slidably connecting the guide block 56 and subsequently the slide plate 44 to the guide rods 52a and 52b. Because of the vertically parallel alignment of the guide rods 52a and 52b and the high tolerances between the bearings of the guide block 56 and the rods 52a and 52b, the slide plate assembly needs only to be slidably connected at the back edge 51. Accordingly, the guide rods 52a and 52b support the slide plate 44 on a horizontal plane for sliding transversely to the conveyor and flow direction. The stop plate 40 and the perimeter undulated guides 48a and 48b including the end guide 50 are elevated sufficiently above the conveyor surface for allowing smooth sliding motion over that surface. The guide block 56 has a handle 60 attached to it so as to make sliding of the slide plate assembly across the conveyor more accessible. In addition, another handle 62, for removing the trays, is located on the slide plate assembly adjacent the perimeter undulated guide 48b on the second frame 42 of the slide plate assembly 14.

A second embodiment of the invention includes the guide block 56 and attached slide plate 44 having a degree of mobility in a direction parallel to the flow direction. Accordingly, the guide block 56 or some portion of the slide plate assembly 14 is slidably attached to the frame 42 to facilitate this motion via bearings or the like or the entire slide plate assembly 14 including the second frame 42 is slidable. The purpose of this additional slidable connection is to ease transport of the articles away from the conveyor such that the articles in the tray loading section 46 can be disengaged and separated from the remaining articles on the staggering portion 20 of the conveyor 12. Additionally, this leaves more room for the stop member or shear wall 63 to move across the conveyor. Obviously, the trays 19a and 19b must remain in or at some point be brought back into alignment with the tray loading section 46.

With the slide plate assembly in the tray loading position as shown in FIG. 5, the conveyor 12 and the staggering portion 20 continue to move the articles and orientate the same into a staggered arrangement. As such, the wall or stop member 63 of the stop plate 40 becomes the end of the conveyor section. However, when it is desired that new trays be loaded with the articles, the slide plate 44 is moved back into the position as shown in FIG. 1.

Referring now to FIG. 7, when the trays 19a and 19b are filled, they can be unloaded by sliding them outwardly from the second frame 42. However, before moving the trays from the frame, the removal arm 45 must be rotated into the vertical orientation as shown in FIG. 7. The removal arm 45 is pivotally attached to the slide plate 44 so that it can be moved in the counter clockwise direction. Upon movement of the arm 45 into the vertical direction, the trays can be unloaded manually or by an automated mechanism for placement into a freeze dryer or the like.

The tray loading apparatus 10 is used by first supplying the articles 38 to the staggering portion 20 with the tray loader in the position shown in FIG. 5. The articles may be supplied to the staggering portion via any conveying means, however, an accumulator such as shown U.S. Pat. No. 4,401,207 is preferred so that the articles may be dispersed to the staggering section based upon the capacity of the tray loader to handle the same. With the slide plate 44 in the tray loading position, as shown in FIG. 5, the articles are moved via the conveyor to the shear wall 63 and in abutment with the same. As more and more articles are pushed downward toward the end of the shear wall 63, the undulated guides 16 and 18 function to align the articles in a staggered orientation by causing the articles to accumulate in conformance with the undulated shape of the guides. In addition, the undulated guide 16 is oscillated for assisting in staggering and aligning the articles in the appropriate manner.

The staggered pattern is shown best in FIG. 4. Staggering simply involves offsetting a row of articles a distance equal to approximately one half the diameter of one substantially cylindrical article in relation to the preceding row. Accordingly, the offset allows wasted space between abutting cylindrical articles to be filled thereby increasing tray capacity and efficiency.

When the conveyor is full to the point of being at least capable of filling the tray loading section 46 with articles, in the staggered orientation, the slide plate assembly is moved to the intake position, as shown in FIG. 4. The operator of the machine grasps the handle 62 attached to the second frame 42 and pushes the slide plate assembly toward the conveyor and transverse to the same. As this movement begins, a trip switch (not shown) shuts off the conveyor belt and the oscillator motor so as to discontinue the movement of the articles. The slide plate assembly is moved away from the operator and the stop plate 40 and the shear wall 63 are moved off the conveying surface 12 such that the shear wall 63 no longer crosses the conveyor.

Upon full movement of the slide plate to the intake position, as shown in FIG. 4, the trip switch is activated again to start the motion of the conveyor 12 and the oscillating undulated guide 16. As such, the articles are again accumulated and oriented in a staggered manner and moved, prearranged, into the tray loading section. The slide plate, upon filling the tray loading section, is then moved back to the tray loading position and the trip switch is activated and the motors stopped, again as shown in FIG. 5, and the articles are moved onto trays 19*a* and 19*b* which have been placed on the top surface of the frame 42. The operator must move the release arm 45 into its vertical orientation for removal of the trays.

The trays are then removed having a full load of articles, efficiently orientated thereon, and the release arm 45 is moved back to its horizontal position for reforming the tray loading section. The trays are then transferred to a freeze dryer or the like either manually or by an automated mechanism. Because the articles are efficiently loaded on the trays in the staggered formation, the subsequent manufacturing operation, i.e. freeze drying, can reach a larger number of articles per single operation of the same. As such, time, energy and cost are saved.

The slide plate assembly is then moved back into alignment with the conveyor section 12 whereby the switch is again tripped and the conveyor and oscillating mechanism are stopped. Upon movement of the slide plate 44 into complete alignment with the conveyor 12, the switch is again tripped and the conveyor is started along with the oscillating undulated guide and the articles are again moved into the tray loading section. If it is determined that different size articles should be loaded onto the trays, the undulated guides 16, 18 and 48*a* and 48*b* may be changed to accommodate the different size articles. As shown in FIG. 11, this is done simply by removing the hand knobs 25*a*–25*c* and 26*a*–26*c*, removing the undesired plates and replacing them with the desired plates.

The present invention may be embodied in other,specific forms without departing from the spirit or essential attributes thereof and accordingly reference should be made to the appended claims rather than to the foregoing specification as indicating the scope of the invention.

What is claimed is:

1. An apparatus for aligning articles in staggered rows, comprising:

a conveying means for moving said articles in a first flow direction;

a staggering mechanism comprising first and second elongated undulated guides, each guide having an undulated edge with a substantially regular repeating pattern, said guides being positioned adjacent said conveying means with said edges directed in substantially the same direction as said first flow direction, and said guides being adapted to contact said articles with said undulated edges and cause said articles to conform to the undulated shape of said edges by causing said articles to accumulate in staggered rows on said conveying means, said first undulated guide having oscillating means for assisting the staggering of said articles.

2. The invention according to claim 1 wherein said second guide is positioned substantially opposite said first guide.

3. The invention according to claim 1 for use in loading trays with the staggered articles wherein said apparatus further comprises:

said conveying means comprising a belt conveying system having a loading end and an unloading end, and means for loading said articles onto trays, said means being positioned adjacent said unloading end of said conveying means.

4. The invention according to claim 1 wherein said oscillating means comprises rotating means attached to an eccentric shaft, said eccentric shaft being connected to said first undulated guide.

5. The invention according to claim 1 wherein the first and second undulated guides are each comprised of a planar member having a serrated edge.

6. An apparatus for aligning articles in staggered rows, comprising:

a conveying means for moving said articles in a first flow direction, said conveying means comprising a belt conveying system having a loading end and an unloading end;

a staggering mechanism comprising first and second elongated undulated guides, each guide having an undulated edge with a substantially regular repeating pattern, said guides being positioned adjacent said conveying means with said edges directed in substantially the same direction as said first flow direction;

said guides being adapted to contact said articles with said undulated edges and to cause said articles to conform to the undulated shape of said edges by causing said articles to accumulate in staggered rows on said conveying means, and means for loading said articles onto trays, said loading means being positioned adjacent said unloading end of said conveying means and comprising a slide plate being slidably mounted to said guide means and movable transversely to said conveying means, said slide plate being adapted for movement into alignment with said conveying means for loading articles and for movement into alignment with a tray for unloading said articles.

7. The invention according to claim 6 wherein said slide plate comprises a frame member slidably attached to said guide means, said frame member having an open side for alignment with said conveying means and for allowing said articles to enter said frame member, said frame member having additional undulated guides for maintaining said staggered formation of said articles upon entrance through said open side and for holding the same in said staggered orientation during movement of said articles away from said conveyor means, said slide plate further comprising a stop member extending upwardly therefrom for stopping article flow when said open side of side frame is moved out of alignment with said conveying means for unloading.

8. The invention according to claim 6 further comprising switching means wherein upon movement of said slide plate and articles away from said conveying means for unloading said articles, said switching means causes said conveying means to stop.

9. An apparatus for aligning articles in staggered rows, comprising:

a conveying means for moving said articles in a first flow direction;

a staggering mechanism comprising first and second elongated undulated guides, each guide having an undulated edge with a substantially regular repeating pattern, said guides being positioned adjacent said conveying means with said edges directed in substantially the same direction as said first flow direction;

said guides being adapted to contact said articles with said undulated edges and cause said articles to conform to the undulated shape of said edges by causing said articles to accumulate in staggered rows on said conveying means, and means for changing the size and shape of said guides for accommodating different size articles.

\* \* \* \* \*